United States Patent [19]
Williams

[11] Patent Number: 4,799,823
[45] Date of Patent: Jan. 24, 1989

[54] PLOW WITH READILY REPLACEABLE WEAR PARTS ESPECIALLY ADAPTED FOR USE IN A VIBRATORY CABLE LAYING MACHINE

[76] Inventor: Thomas D. Williams, Star Rte., Hwy. 39 S., Aurora, Mo. 65605

[21] Appl. No.: 63,427

[22] Filed: Jun. 18, 1987

[51] Int. Cl.[4] .................. A01B 3/64; A01B 23/02; F16L 1/02
[52] U.S. Cl. .................. 405/180; 172/719; 172/753; 172/772; 405/174
[58] Field of Search .............. 405/174, 180, 181, 182; 172/772, 772.5, 753, 719, 722, 726, 737, 764, 769, 752

[56] References Cited

U.S. PATENT DOCUMENTS

| | | | |
|---|---|---|---|
| 1,595,112 | 8/1926 | Mentzer | 172/753 |
| 1,863,671 | 6/1932 | Pitts et al. | 405/181 |
| 2,034,461 | 3/1936 | Daughterty | 172/772 X |
| 2,227,670 | 1/1941 | Peterson | 172/753 X |
| 2,312,372 | 3/1943 | Strandlund | 172/737 |
| 3,348,383 | 10/1967 | Kelley | 405/181 |
| 3,387,668 | 6/1968 | Mathers | 172/719 |
| 3,536,147 | 10/1970 | Norton | 172/719 |
| 3,575,006 | 4/1971 | Rugroden | 405/182 |
| 3,961,788 | 6/1976 | Helton et al. | 172/719 X |
| 4,446,927 | 5/1984 | Robertson | 172/753 |

FOREIGN PATENT DOCUMENTS 1143209  11/1980  Canada ............... 172/772.5

Primary Examiner—Dennis L. Taylor

[57] ABSTRACT

A replaceable wear parts assembly for attachment to the plow shank of a cable laying machine is disclosed that is particularly effective in the environment of vibratory plowing action. The replaceable wear parts are preferably in the form of a shank guard and a plow point which are adapted for attachment either directly to a plow shank, or indirectly to a nose/shank weldment that is welded to the plow shank. The shank guard and plow point are compressively forced against the plow shank or the nose/shank weldment by studs that pass longitudinally through the nose/shank weldment or plow shank in a direction substantially parallel to the direction of the impact forces generated by the vibratory plowing action.

25 Claims, 2 Drawing Sheets

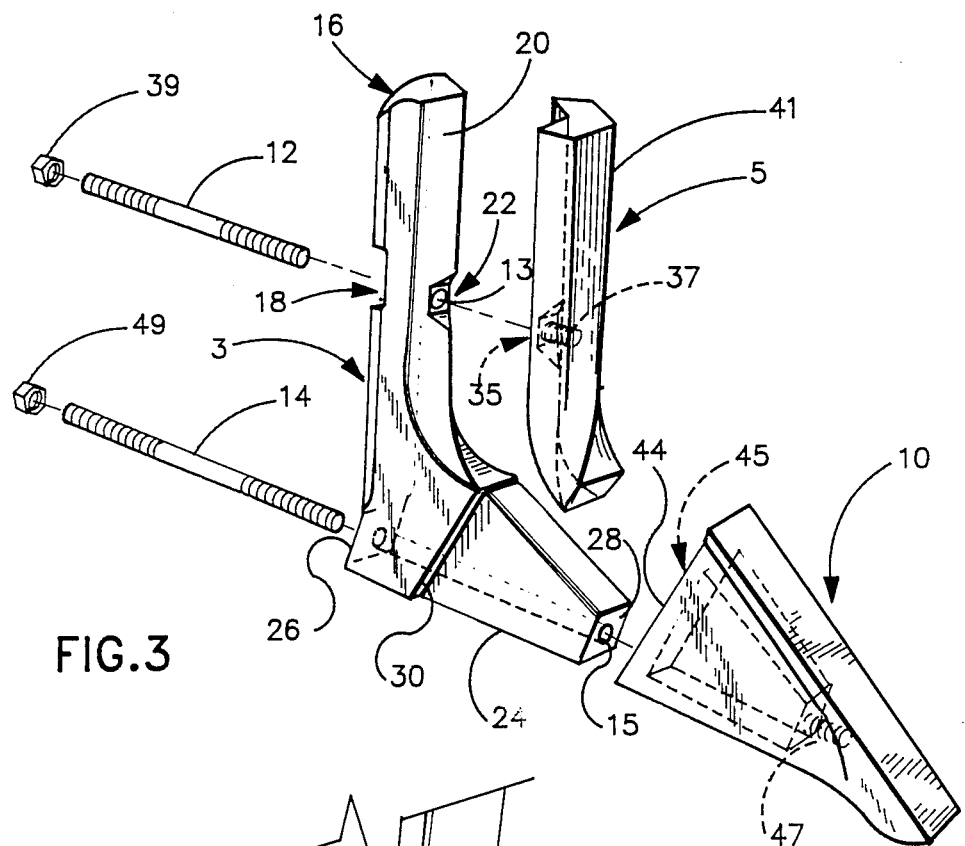
FIG.3
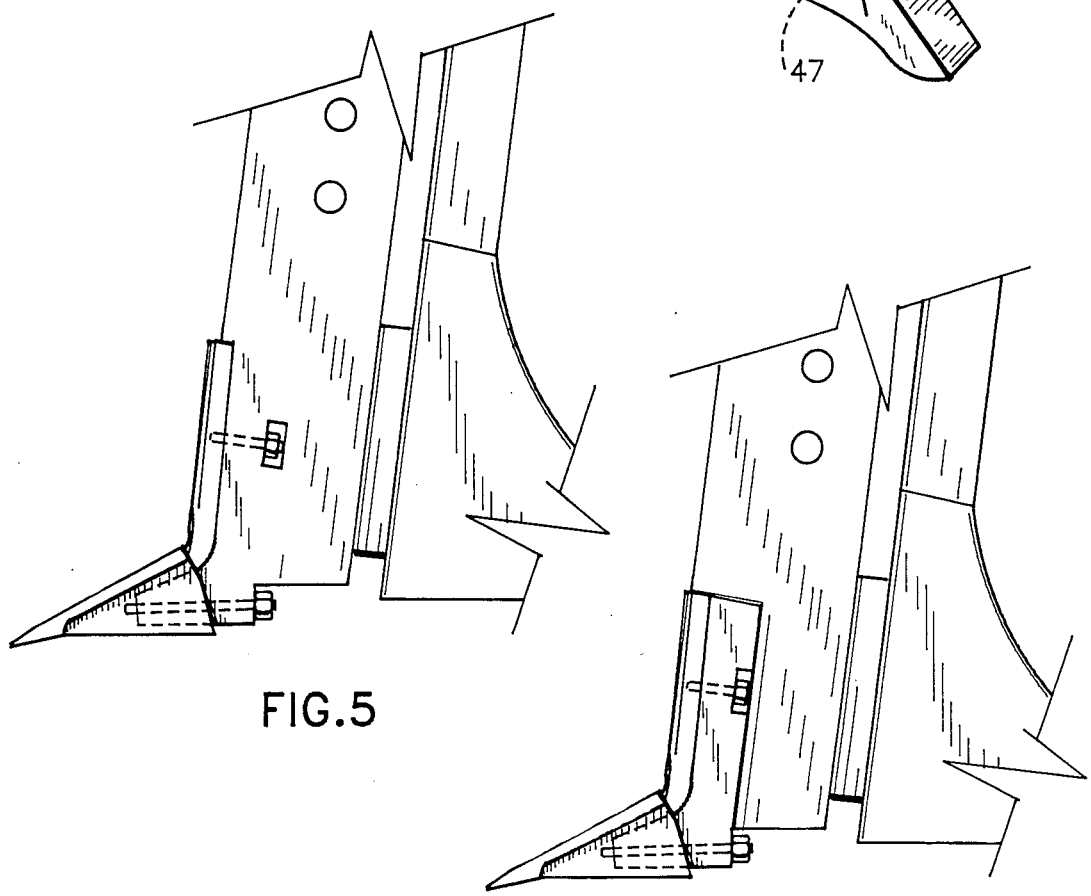
FIG.5
FIG.4

PLOW WITH READILY REPLACEABLE WEAR PARTS ESPECIALLY ADAPTED FOR USE IN A VIBRATORY CABLE LAYING MACHINE

BACKGROUND OF THE INVENTION

The present invention relates generally a cable laying machine including a plow with readily replaceable wear parts. More particularly, the present invention relates to readily replaceable plow points and shank guards adapted for use with cable laying assemblies. The replaceable wear parts are particularly well suited for attachment to plows used in conjunction with a vibratory cable laying machine.

In order to lay a cable in the ground, a trench of suitable size and depth to receive the cable must be dug. The cable is then laid in the trench, and the trench refilled and packed down. For large scale cable laying operations, a tractor having a moveable arm somewhat similar to a backhoe arm, is fitted with a plow shank, as shown in FIG. 1. Normally, a cable feed tube is attached to or incorporated into the back of the plow shank and a spool of cable located somewhere on the tractor feeds cable to the cable feed tube. The plow generally includes a shank having a cutting point that is wider than the cable being laid. Thus, as a tractor moves forward, thereby dragging the plow through the ground, the plow point rips a trench through the ground. The cable is simultaneously dispensed from the cable spool, through the cable feed tube, and into the newly formed trench.

While some so-called static plows are merely dragged through the ground as the tractor moves forward, a much more efficient digging and ripping operation is provided when a vibratory action similar to that of a jackhammer is imparted to the plow. This vibratory action is particularly helpful when cutting a trench through hard ground and/or rocky soil. Also, the vibratory plows can be effectively powered by engines that are smaller than (and with less energy consumption than) engines required for static plows.

To extend the life of the plow, conventional plows have incorporated such features as a replaceable tip or point covering a nose located on the extreme bottom and front of the shank and/or replaceable shank guards disposed immediately above the replaceable point on the lead or front edge of the shank to protect the surfaces of the plow most susceptible to wear.

The nose is typically welded onto the leading bottom edge of the plow shank and is normally wider than the plow shank. Thus, the plow point disposed over the nose normally sustains the greatest amount of wear and therefore is preferably replaceable. Both the nose and its associated plow point are normally tapered, with the plow point being hollowed so as to snugly cover the nose. The conventional method for attaching the point to the tapered nose is to insert a pin crosswise through one wall of the point, through the nose, and out the opposite wall of the point, as depicted in FIG. 2. The replaceable points must be manufactured to provide some leeway and tolerance for alignment of the holes through which the crosspin extends, thereby necessarily resulting in a loose fit and wobble between the point and the nose. Such loose fit causes forces applied to the point to be transferred through the crosspin and to the nose. The crosspins consequently are subject to immense forces tending to bend or displace the crosspins and to further loosen and disattach the point. While such arrangements are adequate for static plows which are merely dragged through the ground, they are totally unsuitable for vibratory plows.

Shank guards have also been traditionally attached to the leading edge of a bar shank to act as a replaceable wear surface for the leading edge of the shank itself. However, since conventional shank guards are attached to the plow shank by a crosspin in the same manner as the plow points previously described, they too are ineffective when used in conjunction with vibratory plows.

Thus, prior to the present invention, vibratory cable laying plows utilized a plow point and a shank guard that had to be welded to the shank itself or utilized replaceable points and guards subject to rapid deterioration and detachment. When a point welded to a plow wears out, either the entire plow shank must be replaced or the worn point must be cut off and a new one welded into place. Obviously, such practices are wasteful and expensive and cause an undue shutdown of cable laying operations. Similarly, replaceable plow points and shank guards attached to the plow by ineffective means tend to loosen and deteriorate rapidly, thereby resulting in the same drawbacks.

Consequently, there is a need for a plow with readily replaceable parts in the form of plow points and shank guards capable of functioning effectively with a relatively long life in the environment of a vibratory cable laying plow.

SUMMARY OF THE INVENTION

To overcome the aforementioned drawbacks of the prior art and to achieve the objects and advantages as broadly described herein, a readily replaceable plow point and shank guard assembly is disclosed which is adapted for effective utilization with either vibratory or non-vibratory cable laying plows.

In accordance with the present invention, a replaceable wear parts assembly for attachment to the plow shank of a cable laying machine is disclosed that it particularly effective in the environment of vibratory plowing action. The replaceable wear parts are in the form of a plow point and a shank guard which are adapted either for attachment directly to a plow shank or to a nose/shank weldment.

In one preferred embodiment a nose/shank weldment having a recess and an exposed lower portion on its back surface is preferably welded to the plow shank. A point attaching means extends longitudinally through the nose/shank weldment to firmly secure the plow point to the nose/shank weldment, and a guard attaching means extends longitudinally through the nose/shank weldment to firmly secure the shank guard to the nose/shank weldment. The exposed lower portion and the recess of the nose/shank weldment provide access to the point and guard attachment means, respectively.

Preferably, the point and guard attaching means each include a stud threaded on each end which passes longitudinally through the nose/shank weldment and is threadably engaged on one end with the plow point and with the shank guard, respectively. The exposed lower portion and the recess of the nose/shank weldment provide access to the other ends of the studs, onto which nuts are placed and tightened, thereby securely fastening the replaceable wear parts to the nose weldment.

In an alternative preferred embodiment, the plow point and the shank guard are attached directly to the plow shank. In this embodiment, a notch and an opening located within the plow shank provide access to the point and shank attaching means, which function in the same manner as previously described with respect to the nose weldment embodiment.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with accompanying drawings in which:

FIG. 3 is an exploded perspective view of a replaceable wear parts assembly for a cable laying plow according to one embodiment of the present invention.

FIG. 4 is a side view of a plow incorporating the replaceable wear parts assembly shown in FIG. 3.

FIG. 5 is a side view of a plow in which the plow point and shank guard are directly attached to the plow shank according to an alternative embodiment of the present invention.

DETAILED DESCRIPTION OF THE DRAWINGS

Figure 1:
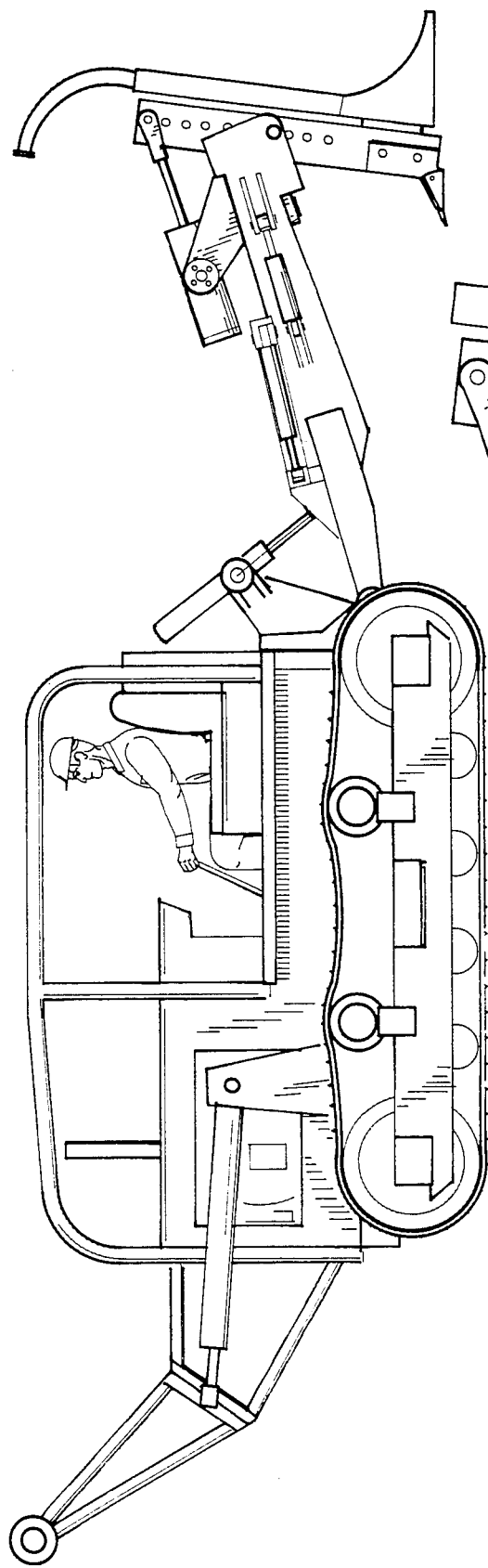
FIG. 1 is a side view of a tractor equipped for laying cable.

Referring now to FIGS. 3 and 4, a preferred embodiment of the replaceable wear parts assembly will be described. The replaceable wear parts include nose/shank weldment 3, shank guard 5, plow point 10, shank stud 12, and point stud 14. The nose/shank weldment 3 is secured to plow shank 1 preferably by welding its back surface 16 to the front edge of plow shank 1. Nose/shank weldment 3 possesses a back surface 16 that includes exposed recess 18, a front surface 20 having a depression 22 located opposite exposed recess 18, and a tapered nose 24 along the lower front edge thereof. Exposed recess 18 and depression 22 are substantially aligned, and stud borehole 13 extends therebetween through the nose/shank weldment 3. Front surface 20 of nose/shank weldment 3 is substantially V-shaped with the sides of nose/shank weldment 3 tapering outward towards the back surface 16. Preferably, the tapering extends to approximately the front surface of exposed recess 18, at which point the sides of nose weldment 3 become substantially flat and oriented in parallel planes. The lower portion 26 of back surface 16 depends below the bottom edge of plow shank 1 and is exposed to form the entrance point of point stud borehole 15, which extends longitudinally through nose 24 and exits at the flattened leading surface 28 of nose 24. Nose 24 is preferably in the shape of a truncated pyramid, although it is contemplated that there are many other appropriate shapes. The flattened leading surface 28 of nose 24 lies in a plane substantially orthogonal to the axis of the point stud borehole 15. Preferably, there are ridges 30 on opposing sides of the nose/shank weldment 3 where the nose 24 joins with the remainder of nose/shank weldment 3.

Figure 2A:
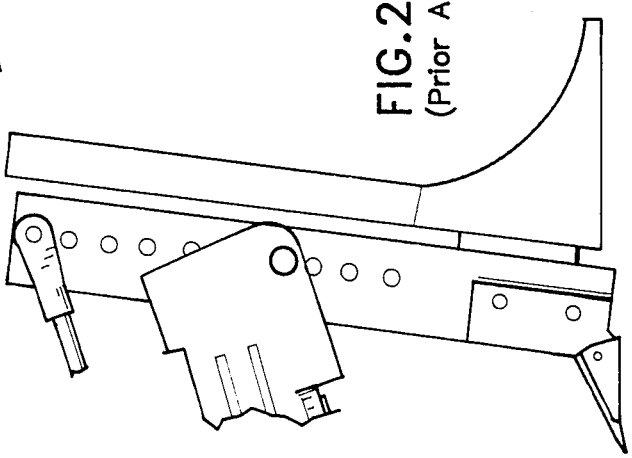
FIG. 2A is a side view of prior art plow shank having a replaceable plow point and shank guard.
Figure 2B:
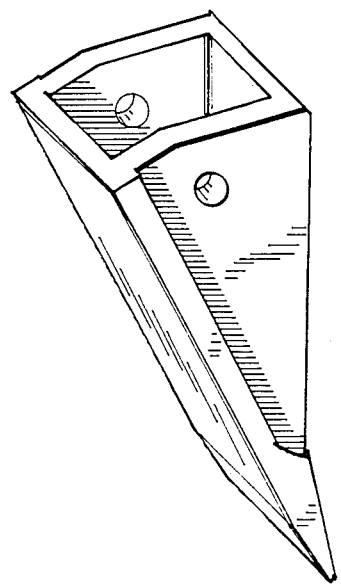
FIG. 2B is a perspective view of the replaceable plow point shown in FIG. 2A.

As used herein, the term longitudinally is defined to mean passing through the nose/shank weldment or plow shank from front to back as seen in FIG. 3. In contrast, a pin that passes through the nose/shank weldment or plow shank from side to side, as the pins in FIG. 2 are shown to do, is defined as passing laterally or crosswise.

Shank guard 5 is shaped to conformingly fit against front surface 20 of nose/shank weldment 3. Boss 35 protrudes from approximately midway down the back surface of guard 5 to be received conformingly within depression 22 of nose weldment 3. The residence of boss 35 within depression 22 substantially prevents vertical displacement of shank guard 5 relative to nose/shank weldment 3 and relieves shank stud 12 from having to absorb any vertical stresses. A threaded passage 37 extends longitudinally inward from boss 35 and is positioned such that when shank guard 5 engages nose weldment 3, shank stud borehole 12 is aligned with threaded passage 37. Thus, to attach the shank guard 5 to nose weldment 3, shank stud 12 is first threaded into threaded passage 37, and then the free threaded end of shank stud 12 is inserted through shank stud borehole 13. Thereafter, a nut 39 is threadably mounted on the free end of shank stud 12 protruding into recess 18 and is tightened to securely fasten shank guard 5 to nose weldment 3. As shown in FIG. 3, the nut 39 is disposed within the exposed recess 18 to permit free access thereto. The leading surface of shank guard 5 is substantially V-shaped, while the back surface is fashioned to conform to the contour of the front surface 20 of nose weldment 3. The "V-shape" of the leading edge 41 of shank guard 5 provides a particularly efficient and self sharpening wear pattern thereby extending the life of replaceable shank guard 5 when compared to other available leading edge shapes.

Plow point 10 possesses a substantially wedge shaped exterior with an enlarged cavity 45 extending forwardly from the rear end thereof. Cavity 45 is adapted to conformingly receive tapered nose 24 of nose/shank weldment 3. A threaded aperture 47 extends forward from cavity 45 and is aligned with point stud borehole 15 when plow point 10 is properly positioned on nose 24. Thus, to attach plow point 10 to the nose 24 portion of nose/shank weldment 3, point stud 14 is inserted through nose stud borehole 15 and is turned to thoroughly engage threaded aperture 47 in plow point 10. A nut 49 is then rotatably mounted on the free threaded end of point stud 14 protruding from the lower portion 26 of the nose/shank weldment 3. By tightening nut 49, the four side surfaces of cavity 45 of plow point 10 are forced against the corresponding four side surfaces of nose 24. The plow point 10 is thereby wedged onto nose 24 with a relatively large surface contact. Consequently, the tremendous shock forces generated by the vibratory actions of the plow are transferred primarily through the metal to metal contact over a large surface area of the plow point 10 and the nose/shank weldment 3, with only a small fraction of such forces being imposed upon point stud 14 and its associated nut 49. As the plow's primary cutting edge, plow point 10 is subjected to the largest impact forces generated by the vibratory cable laying machine. Thus, it is essential that plow point 10 be securely fastened to nose/shank weldment 3 without wobble.

The studs 12, 14 that secure the plow point 10 and shank guard 5 to the nose/shank weldment 3 pull the replaceable parts towards the plow shank 1, pulling in the same direction as the forces applied to these replaceable parts when the plow is in use. Thus the forces tend to compress the parts assembly together, and tend not to act in a manner or direction that pulls the parts assembly apart or that puts pressure on the attachment means to hold the parts assembly together. With the described arrangement, the forces imposed on the studs tend to be substantially coaligned with the shafts of the studs 12, 14, rather than orthogonal to the length of the crosspins, as with prior art plows. Consequently, the studs 12, 14 are better able to absorb and dissipate any forces acting upon them, and the stress is better distributed throughout the studs 12, 14. This transmission of forces lengthwise along the shafts 12, 14 is particularly important since the shock forces imparted on the plow tip are very great. Moreover, it will be appreciated that the studs 12, 14 are located so as to avoid any forceful contact with the earth when the plow is used. Because of the orientation of prior art crosspins, the parts being held together by such pins tend to bend or loosen quickly, which loosening is rapidly accelerated by the vibratory forces, thereby causing substantial damage to both such pins and the replaceable parts.

Referring next to FIG. 5, an alternative embodiment of the present invention is shown that incorporates a plow shank including a tapered nose adapted to directly receive the the replaceable shank guard and the replaceable plow point. As can be seen FIG. 5, a hole is bored laterally through the plow shank, and a notch is cut into the edge of the plow shank at heights corresponding to the location of the boss 35 of the shank guard 5. Then a hole is bored longitudinally between the notch and the lateral borehole to receive shank stud 12. A second notch may be cut in the bottom edge of the plow shank, and a hole bored longitudinally between the nose and the notch to receive point stud 14. Thus, it should be readily apparent that the present invention can be utilized by retrofitting existing plow shanks.

Although only two major embodiments of the present invention have been described herein, it should be understood that the present invention may be embodied in many other specific forms without departing from the spirit or scope of the invention. Particularly, the shapes of the replaceable wear parts could be altered to better suit cutting a trench in particular types of soil. Additionally, while studs have been described as an appropriate means for fastening the wear parts attachments to the plow shank, bolts or other equivalent fastening systems may be advantageously used. Moreover, the nuts 39, 49 can be lock nuts or a combination of nuts and washers. Therefore, the present examples and embodiments are to be considered as illustrative and not restrictive, and the invention is not to be limited to the details given herein, but may be modified within the scope of the appended claims.

What is claimed is:

1. In a cable laying machine that includes a vehicle having a controllable arm to which a plow shank may be attached for ripping a trough in the ground and having a cable dispensing assembly that includes a spool of cable and a cable feed tube attached to said plow shank for laying the cable in the ground, the improvement comprising:

a nose/shank weldment including a front surface, a back surface having a recess and an exposed lower portion, a tapered nose, a shank stud borehole aligned with said recess and extending substantially longitudinally through said nose/shank weldment, and a point stud borehole aligned with said exposed lower back portion and extending substantially longitudinally through said tapered nose, said nose/shank weldment being attached to said shank;

a replaceable shank guard adapted to engage the front surface of said nose/shank weldment, said shank guard including a threaded passage substantially aligned with said shank stud borehole;

a shank stud for securing said shank guard to said nose/shank weldment, said shank stud passing through said shank stud borehole and engaging said shank guard threaded passage such that an end of said shank stud is accessible through said recess;

a replaceable plow point adapted to engage said tapered nose, said plow point including a threaded aperture substantially aligned with said point stud borehole; and a point stud for securing said plow point to said nose/shank weldment, said point stud passing through said point stud borehole and engaging said plow point threaded aperture such that an end of said point stud is accessible at said exposed lower portion of said nose/shank weldment.

2. A cable laying machine is recited in claim 1 wherein said nose is fashioned substantially in the shape of a truncated pyramid and wherein said plow point possesses an exposed cavity substantially conforming in shape to said nose and wherein said point attaching means compressively forces said plow point against said nose when said nose is disposed within said plow point cavity.

3. A cable laying machine as recited in claim 1 wherein said nose/shank weldment is provided with a depression along the front surface thereof, wherein said shank guard is provided with a boss conformingly shaped to the shape of said depression and adapted to conformingly engage said depression, wherein said shank stud borehole passes into said depression, and wherein said threaded passage extends from said boss.

4. A replaceable wear part assembly for attachment to a plow shank, the wear part assembly comprising, a nose/shank weldment secured to said plow shank, said nose/shank weldment including a nose and a point stud borehole passing substantially longitudinally from the back surface thereof to the forward edge of said nose;

a replaceable plow point adapted to engage said nose, said plow point including a threaded aperture substantially aligned with said point stud borehole;

a point stud having a first threaded end and a second threaded end, said point stud adapted to pass through said point stud borehole such that said first threaded point stud end threadably engages said threaded aperture and such that said second threaded point stud end protrudes rearward from said back surface; and a first threaded nut adapted for threadably mounting engagement on said second threaded point stud end.

5. A replaceable wear part assembly as recited in claim 4 wherein said nose/shank weldment possesses a recess on the back surface thereof facing said plow shank, and wherein said replaceable wear part assembly further comprises a replaceable shank guard adapted to engage and be mounted over the front surface of said nose/shank weldment and further comprises guard attaching means for securely fastening said shank guard to said nose/shank weldment, said guard attaching means extending substantially longitudinally through said nose/shank weldment and being accessible through said recess.

6. A replaceable wear part assembly according to claim 4 wherein said nose is fashioned substantially in the shape of a truncated pyramid and wherein said plow point possesses an exposed cavity substantially conforming in shape to said nose and wherein said first threaded nut and said point stud are adapted to compressively force said plow point against said nose when said nose is disposed within said plow point cavity.

7. A replaceable wear part assembly as recited in claim 4 wherein said nose/shank weldment is secured to said plow shank such that the back surface of said nose/shank weldment possesses an exposed portion depending below said plow shank and wherein said second threaded point stud end is accessible from the rear of said exposed portion.

8. A replaceable wear part assembly as recited in claim 5, wherein said nose/shank weldment includes a shank stud borehole passing substantially longitudinally from said nose/shank weldment recess to the front surface of said nose/shank weldment, wherein said shank guard includes a threaded passage substantially aligned with said shank stud borehole, wherein said guard attaching means includes a shank stud having a first threaded end and a second threaded end, said shank stud adapted to pass through said shank stud borehole such that said first threaded shank stud end threadably engages said threaded passage and such that said second threaded shank stud end protrudes into said nose/shank weldment recess, and wherein said guard attaching means further includes a second threaded nut adapted for threadably mounting engagement on said second threaded shank stud end.

9. A replaceable wear part assembly as recited in claim 8 wherein said nose/shank weldment is provided with a depression along the front surface thereof, wherein said shank guard is provided with a boss conformingly shaped to the shape of said depression and adapted to conformingly engage said depression, wherein said shank stud borehole passes into said depression, and wherein said threaded passage extends from said boss.

10. A replaceable wear part assembly according to claim 8 wherein said nose is fashioned substantially in the shape of a truncated pyramid and wherein said plow point possesses an exposed cavity substantially conforming in shape to said nose and wherein said first threaded nut and said point stud are adapted to compressively force said plow point against said nose when said nose is disposed within said plow point cavity.

11. A replaceable wear part assembly for attachment to a plow shank, the wear part assembly comprising,
a nose/shank weldment secured to said plow shank and possessing a recess on the back surface thereof facing said plow shank, said nose/shank weldment including a shank stud borehole passing substantially longitudinally from said nose/shank weldment recess to the front surface of said nose/shank weldment;
a replaceable shank guard adapted to engage and be mounted over the front surface of said nose/shank weldment, said shank guard including a threaded passage substantially aligned with said shank stud borehole;
a shank stud having a first threaded end and a second threaded end, said shank stud adapted to pass through said shank stud borehole such that said first threaded shank stud end threadably engages said threaded passage and such that said second threaded shank stud end protrudes into said nose/shank weldment recess; and
a second threaded nut adapted for threadably mounting engagement on said second threaded shank stud end.

12. A replaceable wear part assembly as recited in claim 11 wherein said nose/shank weldment is provided with a depression along the front surface thereof, wherein said shank guard is provided with a boss conformingly shaped to the shape of said depression and adapted to conformingly engage said depression.

13. A replaceable wear part assembly as recited in claim 12 wherein said shank stud borehole passes into said depression and wherein said threaded passage extends from said boss.

14. A replaceable wear part assembly as recited in claim 11 wherein said nose/shank weldment includes a nose end, and wherein said replaceable wear part assembly further comprises a replaceable plow point adapted to engage said nose and further comprises point attaching means for securely fastening said plow point to said nose, said point attaching means extending substantially longitudinally through said nose/shank weldment and being accessible from the rear of said nose/shank weldment.

15. A replaceable wear part assembly as recited in claim 14 wherein said nose/shank weldment is secured to said plow shank such that the back surface of said nose/shank weldment possesses an exposed portion depending below said plow shank and wherein said second threaded point stud end is accessible from the rear of said exposed portion.

16. A replaceable wear part assembly according to claim 14 wherein said nose is fashioned substantially in the shape of a truncated pyramid and wherein said plow point possesses an exposed cavity substantially conforming in shape to said nose and wherein said point attaching means compressively forces said plow point against said nose when said nose is disposed within said plow point cavity.

17. A plow as recited in claim 14 wherein said plow body is provided with a depression along the front surface thereof, wherein said shank guard is provided with a boss conformingly shaped to the shape of said depression and adapted to conformingly engage said depression, wherein said shank stud borehole passes into said depression, and wherein said threaded passage extends from said boss.

18. A replaceable wear part assembly as recited in claim 15, wherein said nose/shank weldment includes a point stud borehole passing substantially longitudinally from said exposed portion to the forward edge of said nose, wherein said plow point includes a threaded aperture substantially aligned with said point stud borehole, wherein said point attaching means includes a point stud having a first threaded end and a second threaded end, said point stud adapted to pass through said point stud borehole such that said first threaded point stud end threadably engages said threaded aperture and such that said second threaded point stud end protrudes rearward from said exposed portion, and wherein said point attaching means further includes a first threaded nut adapted for threadably mounting engagement on said second threaded point stud end.

19. A plow comprising:
a plow body having a nose extending from the lower leading surface thereof;

a replaceable shank guard adapted for attachment to the leading surface of said plow body;

a replaceable plow point adapted for attachment to said nose;

point attaching means for securely fastening said plow point to said plow body, said point attaching means including:

a point stud borehole passing substantially longitudinally to the forward edge of said nose;

a threaded aperture disposed in said plow point and substantially aligned with said point stud borehole; and a point stud adapted to pass through said point stud borehole and threadably engage said threaded aperture; and fastening means for securing said point stud to said plow body; and guard attaching means for securely fastening said shank guard to said plow body.

20. A plow as recited in claim 19 wherein said guard attaching means includes:

a shank stud borehole extending substantially longitudinally from an aperture in said plow body to the leading edge of said plow body;

a threaded passage disposed in said shank guard and being substantially aligned with said shank stud borehole;

a shank stud adapted to pass through said shank stud borehole and threadably engage said threaded passage; and fastening means disposed within said plow body aperture for securing said shank stud to said plow body.

21. A plow as recitd in claim 19 wherein said plow body is provided with a depression along the front surface thereof, wherein said shank guard is provided with a boss conformingly shaped to the shape of said depression and adapted to conformingly engage said depression, wherein said shank stud borehole passes into said depression, and wherein said threaded passage extends from said boss.

22. A plow comprising:

a plow body possessing an aperture and having a nose extending from the lower leading surface thereof;

a replaceable shank guard adapted for attachment to the leading surface of said plow body;

a replaceable plow point adapted for attachment to said nose;

point attaching means for securely fastening said plow point to said plow body;

guard attaching means for securely fastening said shank guard to said plow body, said guard attaching means including:

a shank stud borehole extending substantially longitudinally from said plow body aperture to the leading edge of said plow body;

a threaded passage disposed in said shank guard and being substantially aligned with said shank stud borehole;

a shank stud adapted to pass through said shank stud borehole and threadably engage said threaded passage; and fastening means disposed within said plow body aperture for securing said shank stud to said plow body.

23. A plow as recited in claim 22, wherein said point attaching means includes:

a point stud borehole passing substantially longitudinally to the forward edge of said nose;

a threaded aperture disposed in said plow point and substantially aligned with said point stud borehole;

a point stud adapted to pass through said point stud borehole and threadably engage said threaded aperture; and fastening means for securing said point stud to said plow body.

24. A plow as recited in claim 22 wherein said plow body is provided with a depression along the front surface thereof, wherein said shank guard is provided with a boss conformingly shaped to the shape of said depression and adapted to conformingly engage said depression, wherein said shank stud borehole passes into said depression, and wherein said threaded passage extends from said boss.

25. A plow as recited in claim 23 wherein said plow body is provided with a depression along the front surface thereof, wherein said shank guard is provided with a boss conformingly shaped to the shape of said depression and adapted to conformingly engage said depression, wherein said shank stud borehole passes into said depression, and wherein said threaded passage extends from said boss.

* * * * *